(12) United States Patent
Ben Dayan et al.

(10) Patent No.: US 11,816,333 B2
(45) Date of Patent: *Nov. 14, 2023

(54) CONGESTION MITIGATION IN A DISTRIBUTED STORAGE SYSTEM

(71) Applicant: Weka.IO Ltd., Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL); Tomer Filiba, Tel Aviv (IL)

(73) Assignee: Weka.IO Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 18/114,326

(22) Filed: Feb. 27, 2023

(65) Prior Publication Data

US 2023/0229306 A1 Jul. 20, 2023

Related U.S. Application Data

(63) Continuation of application No. 17/351,805, filed on Jun. 18, 2021, now Pat. No. 11,609,694, which is a
(Continued)

(51) Int. Cl.
*G06F 3/06* (2006.01)
*G06F 16/182* (2019.01)
(Continued)

(52) U.S. Cl.
CPC ............ *G06F 3/0607* (2013.01); *G06F 3/061* (2013.01); *G06F 3/0604* (2013.01); *G06F 3/067* (2013.01);
(Continued)

(58) Field of Classification Search
CPC ...... G06F 3/0607; G06F 3/0604; G06F 3/061; G06F 3/0613; G06F 3/0619;
(Continued)

(56) References Cited

U.S. PATENT DOCUMENTS 6,044,367 A 3/2000 Wolff
6,108,304 A 8/2000 Abe et al.
(Continued)

OTHER PUBLICATIONS

F. Iorio, K. Muller, A. Castelfranco, O. Callanan and T. Sanuki, "Asymmetric flow control for data transfer in hybrid computing systems," in IBM Journal of Research and Development, vol. 54, No. 1, pp. 6:1-6:13, Jan.-Feb. 2010, doi: 10.1147/JRD.2009. 2036385. (Year: 2010).*

(Continued)

*Primary Examiner* — Khoa D Doan
(74) *Attorney, Agent, or Firm* — McAndrews, Held & Malloy, Ltd.

(57) ABSTRACT

A system comprises a plurality of computing devices that are communicatively coupled via a network and have a file system distributed among them, and comprises one or more file system request buffers residing on one or more of the plurality of computing devices. File system choking management circuitry that resides on one or more of the plurality of computing devices is operable to separately control: a first rate at which a first type of file system requests (e.g., one of data requests, data read requests, data write requests, metadata requests, metadata read requests, and metadata write requests) are fetched from the one or more buffers, and a second rate at which a second type of file system requests (e.g., another of data requests, data read requests, data write requests, metadata requests, metadata read requests, and metadata write requests) are fetched from the one or more buffers.

22 Claims, 14 Drawing Sheets

Related U.S. Application Data continuation of application No. 16/716,560, filed on Dec. 17, 2019, now Pat. No. 11,079,938, which is a continuation of application No. 16/355,126, filed on Mar. 15, 2019, now Pat. No. 10,545,669, which is a continuation of application No. 15/976,467, filed on May 10, 2018, now Pat. No. 10,268,378, which is a continuation of application No. 15/623,608, filed on Jun. 15, 2017, now Pat. No. 10,019,165, which is a continuation of application No. 15/041,123, filed on Feb. 11, 2016, now Pat. No. 9,733,834.

(60) Provisional application No. 62/288,106, filed on Jan. 28, 2016.

(51) Int. Cl.
| | | |
|---|---|---|
| *H04L 67/01* | (2022.01) | |
| *H04L 47/70* | (2022.01) | |
| *H04L 67/06* | (2022.01) | |
| *H04L 43/0882* | (2022.01) | |
| *H04L 47/12* | (2022.01) | |
| *H04L 47/6275* | (2022.01) | |
| *H04L 49/90* | (2022.01) | |
| *H04L 67/1097* | (2022.01) | |
| *H04L 43/16* | (2022.01) | |

(52) U.S. Cl.
CPC .......... *G06F 3/0613* (2013.01); *G06F 3/0619* (2013.01); *G06F 3/0635* (2013.01); *G06F 3/0643* (2013.01); *G06F 3/0647* (2013.01); *G06F 3/0656* (2013.01); *G06F 3/0665* (2013.01); *G06F 3/0673* (2013.01); *G06F 3/0685* (2013.01); *G06F 16/182* (2019.01); *G06F 16/1827* (2019.01); *H04L 43/0882* (2013.01); *H04L 43/16* (2013.01); *H04L 47/12* (2013.01); *H04L 47/6275* (2013.01); *H04L 47/70* (2013.01); *H04L 49/90* (2013.01); *H04L 67/01* (2022.05); *H04L 67/06* (2013.01); *H04L 67/1097* (2013.01)

(58) Field of Classification Search
CPC .... G06F 3/0635; G06F 3/0643; G06F 3/0647; G06F 3/0656; G06F 3/0665; G06F 3/067; G06F 3/0673; G06F 3/0685; G06F 16/182; G06F 16/1827; H04L 43/0882; H04L 43/16; H04L 47/12; H04L 47/6275; H04L 47/70; H04L 49/90; H04L 67/01; H04L 67/06; H04L 67/1097
See application file for complete search history.

(56) References Cited

U.S. PATENT DOCUMENTS

| | | | |
|---|---|---|---|
| 6,128,717 A | 10/2000 | Harrison et al. | |
| 6,292,856 B1 | 9/2001 | Marcotte | |
| 6,385,673 B1 | 5/2002 | DeMoney | |
| 7,447,839 B2 | 11/2008 | Uppala | |
| 7,626,926 B2 | 12/2009 | Abi-Nassif et al. | |
| 7,877,511 B1 * | 1/2011 | Berger | G06F 16/10 709/212 |
| 8,259,483 B1 | 9/2012 | Ayers | |
| 8,347,010 B1 | 1/2013 | Radovanovic | |
| 8,843,459 B1 | 9/2014 | Aston et al. | |
| 8,918,478 B2 | 12/2014 | Ozzie et al. | |
| 9,733,834 B1 | 8/2017 | Ben Dayan et al. | |
| 10,019,165 B2 | 7/2018 | Ben Dayan et al. | |
| 10,268,378 B2 | 4/2019 | Ben Dayan et al. | |
| 10,545,669 B2 | 1/2020 | Ben Dayan et al. | |
| 11,079,938 B2 | 8/2021 | Ben Dayan et al. | |
| 2002/0124137 A1 | 9/2002 | Ulrich et al. | |
| 2002/0138559 A1 | 9/2002 | Ulrich et al. | |
| 2002/0191311 A1 | 12/2002 | Ulrich et al. | |
| 2003/0115218 A1 | 6/2003 | Bobbitt et al. | |
| 2003/0135639 A1 | 7/2003 | Marejka et al. | |
| 2004/0064600 A1 | 4/2004 | Lee et al. | |
| 2004/0098415 A1 | 5/2004 | Bone et al. | |
| 2005/0076031 A1 | 4/2005 | Xu et al. | |
| 2005/0138195 A1 | 6/2005 | Bono | |
| 2005/0289152 A1 | 12/2005 | Earl et al. | |
| 2006/0112155 A1 | 5/2006 | Earl et al. | |
| 2007/0036168 A1 | 2/2007 | Hsiao et al. | |
| 2007/0133419 A1 | 6/2007 | Segel | |
| 2010/0023722 A1 | 1/2010 | Tabbara et al. | |
| 2011/0022566 A1 | 1/2011 | Beaverson et al. | |
| 2011/0060887 A1 | 3/2011 | Thatcher et al. | |
| 2011/0093628 A1 | 4/2011 | Bulgin et al. | |
| 2011/0093679 A1 | 4/2011 | Cyr et al. | |
| 2011/0119518 A1 | 5/2011 | Orfiteli | |
| 2011/0258378 A1 | 10/2011 | Ananthanarayanan et al. | |
| 2012/0005419 A1 | 1/2012 | Wu et al. | |
| 2012/0198152 A1 | 8/2012 | Terry et al. | |
| 2012/0254508 A1 | 10/2012 | Walls | |
| 2012/0271976 A1 | 10/2012 | Zhu et al. | |
| 2013/0103787 A1 | 4/2013 | Glover et al. | |
| 2014/0244897 A1 | 8/2014 | Goss et al. | |
| 2014/0281280 A1 | 9/2014 | Goss et al. | |
| 2014/0282514 A1 | 9/2014 | Carson et al. | |
| 2015/0142869 A1 | 5/2015 | Ulrich et al. | |
| 2015/0210095 A1 | 7/2015 | Anzai | |
| 2015/0242135 A1 | 8/2015 | Fujimoto | |
| 2015/0248366 A1 | 9/2015 | Bergsten et al. | |
| 2015/0254088 A1 | 9/2015 | Chou et al. | |
| 2015/0355971 A1 | 12/2015 | Becker-Szendy et al. | |
| 2016/0077745 A1 | 3/2016 | Patel et al. | |

OTHER PUBLICATIONS

Int'l Search Report and Written Opinion for PCT Appln No. PCT/IB2017/000128 dated May 19, 2017.

D. Llorente, K. Karras, M. Meitinger, H. Rauchfuss, T. Wild and A. Herkersdorf, "Accelerating Packet Buffering and Administration in Network Processors," 2007 International Symposium on Integrated Circuits, 2007, pp. 373-377, doi: 10.11 09/ISICIR.2007.4441876. (Year: 2007).

* cited by examiner

CONGESTION MITIGATION IN A DISTRIBUTED STORAGE SYSTEM

PRIORITY CLAIM

This application is a continuation of U.S. patent application Ser. No. 17/351,805, filed Jun. 18, 2021, which is a continuation of U.S. patent application Ser. No. 16/716,560 filed Dec. 17, 2019 (now U.S. Pat. No. 11,079,938), which is a continuation of U.S. patent application Ser. No. 16/355,126 filed Mar. 15, 2019 (now U.S. Pat. No. 10,545,669), which is a continuation of U.S. patent application Ser. No. 15/976,467 filed May 10, 2018 (now U.S. Pat. No. 10,268,378), which is a continuation of U.S. patent application Ser. No. 15/623,608 filed Jun. 15, 2017 (now U.S. Pat. No. 10,019,165), which is a continuation of U.S. patent application Ser. No. 15/041,123 filed Feb. 11, 2016 (now U.S. Pat. No. 9,733,834), which claims priority to U.S. provisional patent application 62/288,106 titled "Congestion Mitigation in a Distributed Storage System" filed on Jan. 28, 2016. Each of the above identified documents is hereby incorporated herein by reference in its entirety.

INCORPORATION BY REFERENCE

Each of the following documents is hereby incorporated herein by reference in its entirety:

U.S. patent application Ser. No. 14/789,422 titled "Virtual File System Supporting Multi-Tiered Storage" and filed on Jul. 1, 2015;

U.S. patent application Ser. No. 14/833,053 titled "Distributed Erasure Coded Virtual File System" and filed on Aug. 22, 2015;

U.S. patent application Ser. No. 15/041,236 titled "Resource Monitoring in a Distributed Storage System" and filed on Feb. 11, 2016.

BACKGROUND

Limitations and disadvantages of conventional approaches to data storage will become apparent to one of skill in the art, through comparison of such approaches with some aspects of the present method and system set forth in the remainder of this disclosure with reference to the drawings.

BRIEF SUMMARY

Methods and systems are provided for congestion mitigation in a distributed storage system substantially as illustrated by and/or described in connection with at least one of the figures, as set forth more completely in the claims.

DETAILED DESCRIPTION

Figure 1:
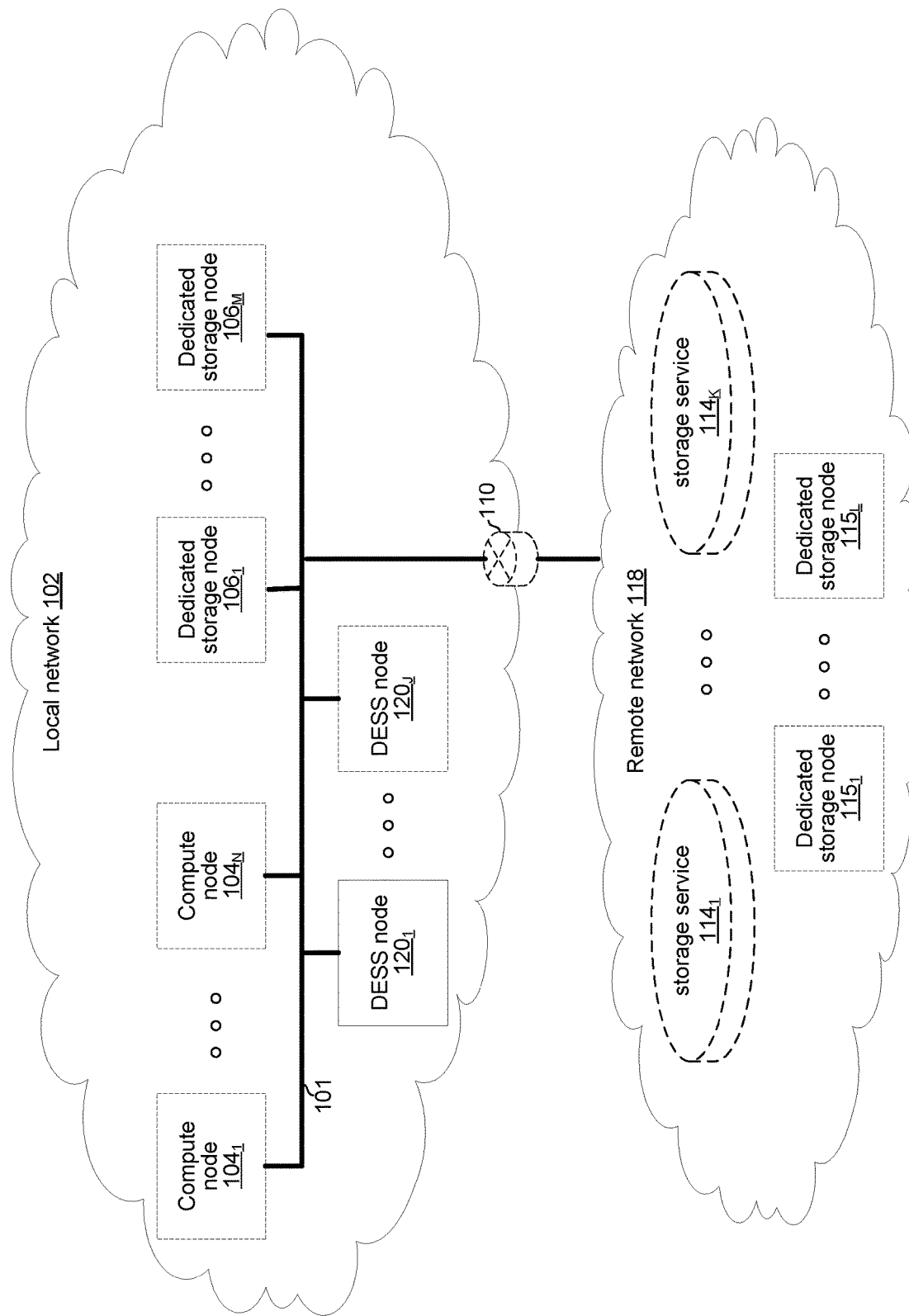
FIG. 1 illustrates various example configurations of a distributed electronic storage system in accordance with aspects of this disclosure.

FIG. 1 illustrates various example configurations of a distributed electronic storage system in accordance with aspects of this disclosure. Shown in FIG. 1 is a local area network (LAN) 102 comprising one or more distributed electronic storage system (DESS) nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router 110 that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1). The nodes of the LAN 102 are communicatively coupled via interconnect 101 (e.g., copper cables, fiber cables, wireless links, switches, bridges, hubs, and/or the like).

Each compute node $104_n$ (n an integer, where $1 \leq n \leq N$) is a networked computing device (e.g., a server, personal computer, or the like) that comprises circuitry for running a variety of client processes (either directly on an operating system of the node $104_n$ and/or in one or more virtual machines/containers running on the device $104_n$) and for interfacing with one or more DESS nodes 120. As used in this disclosure, a "client process" is a process that reads data from storage and/or writes data to storage in the course of performing its primary function, but whose primary function is not storage-related (i.e., the process is only concerned that its data is reliably stored and retrievable when needed, and not concerned with where, when, or how the data is stored). Example applications which give rise to such processes include: an email server application, a web server application, office productivity applications, customer relationship management (CRM) applications, and enterprise resource planning (ERP) applications, just to name a few. Example configurations of a compute node $104_n$ are described below with reference to FIG. 2.

Each DESS node $120_j$ (j an integer, where $1 \leq j \leq J$) is a networked computing device (e.g., a server, personal computer, or the like) that comprises circuitry for running DESS processes and, optionally, client processes (either directly on an operating system of the device $104_n$ and/or in one or more virtual machines running in the device $104_n$). As used in this disclosure, a "DES S process" is a process that implements aspects of one or more of: the DESS driver, the DESS front end, the DESS back end, and the DESS memory controller described below in this disclosure (any one or more of which may implement one or more choking processes, as described below). Example configurations of a DESS node $120_j$ are described below with reference to FIG. 3. Thus, in an example implementation, resources (e.g., processing and memory resources) of the DESS node $120_j$ may be shared among client processes and DESS processes. The processes of the DESS may be configured to demand relatively small amounts of the resources to minimize the impact on the performance of the client processes. From the perspective of the client process(es), the interface with the DESS may be independent of the particular physical machine(s) on which the DESS process(es) are running Example configurations of a DESS node $120_j$ are described below with reference to FIG. 3.

Each on-premises dedicated storage node 106. (m an integer, where 1≤m≤M) is a networked computing device and comprises one or more storage devices and associated circuitry for making the storage device(s) accessible via the LAN 102. An example configuration of a dedicated storage node $106_m$ is described below with reference to FIG. 4.

Each storage service $114_k$ (k an integer, where 1≤k≤K) may be a cloud-based service such as Amazon S3, Microsoft Azure, Google Cloud, Rackspace, Amazon Glacier, and Google Nearline.

Each remote dedicated storage node $115_l$ (l an integer, where 1≤l≤L) may be similar to, or the same as, an on-premises dedicated storage node 106. In an example implementation, a remote dedicated storage node $115_l$ may store data in a different format and/or be accessed using different protocols than an on-premises dedicated storage node 106 (e.g., HTTP as opposed to Ethernet-based or RDMA-based protocols).

Figure 2:
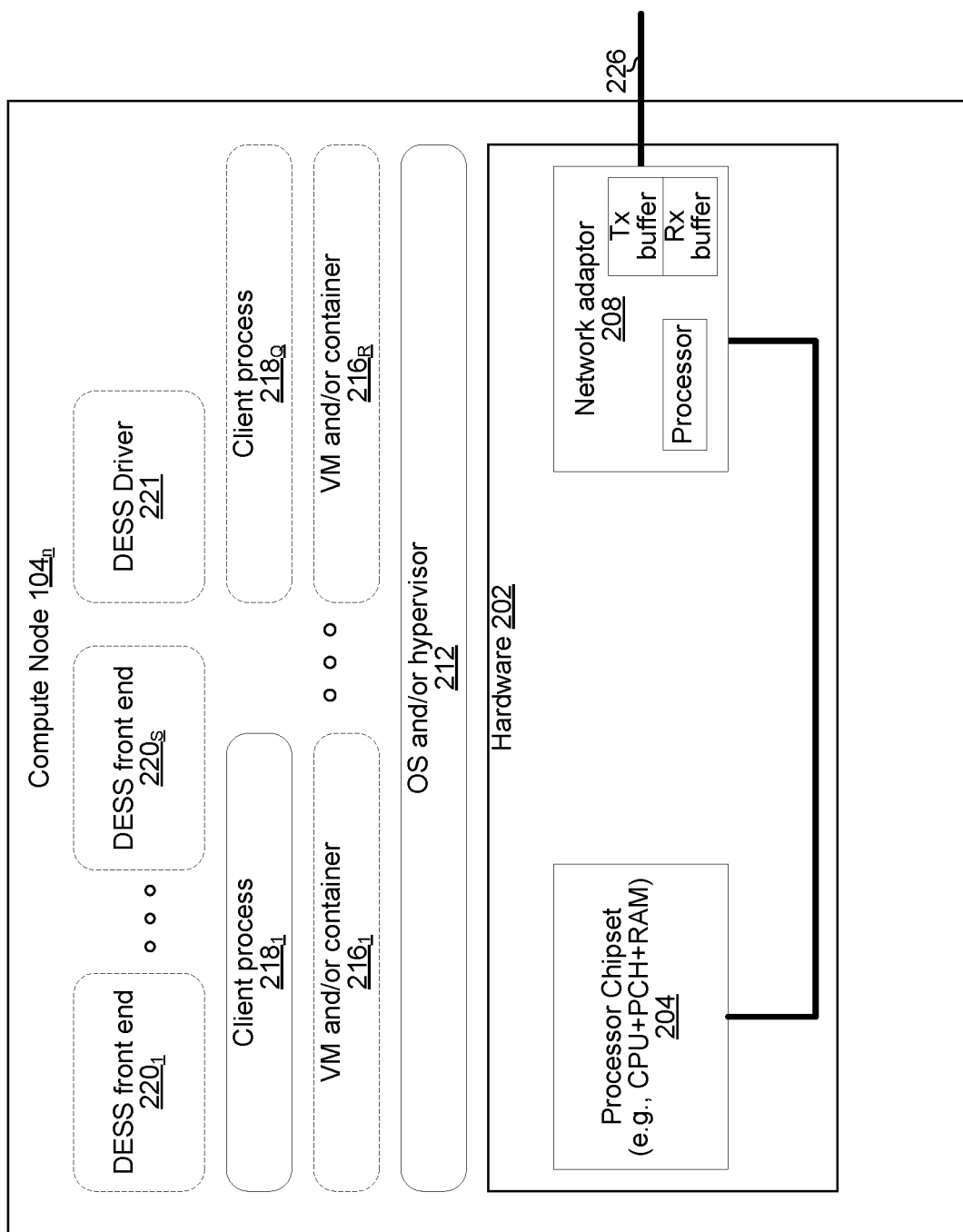
FIG. 2 illustrates various example configurations of a compute node that uses a distributed electronic storage system in accordance with aspects of this disclosure.

FIG. 2 illustrates various example configurations of a compute node that uses a DESS in accordance with aspects of this disclosure. The example compute node $104_n$ comprises hardware 202 that, in turn, comprises a processor chipset 204 and a network adaptor 208.

The processor chipset 204 may comprise, for example, an x86-based chipset comprising a single or multi-core processor system on chip, one or more RAM ICs, and a platform controller hub IC. The chipset 204 may comprise one or more bus adaptors of various types for connecting to other components of hardware 202 (e.g., PCIe, USB, SATA, and/or the like).

The network adaptor 208 may, for example, comprise circuitry for interfacing to an Ethernet-based and/or RDMA-based network. In an example implementation, the network adaptor 208 may comprise a processor (e.g., an ARM-based processor) and one or more of the illustrated software components may run on that processor. The network adaptor 208 interfaces with other members of the LAN 100 via (wired, wireless, or optical) link 226. In an example implementation, the network adaptor 208 may be integrated with the chipset 204.

Software running on the hardware 202 of compute node $104_n$ includes at least: an operating system and/or hypervisor 212, one or more client processes 218 (indexed by integers from 1 to Q, for Q≥1) and one or both of: a DESS driver 221 and DESS front end 220. Additional software that may optionally run on the compute node $104_n$ includes: one or more virtual machines (VMs) and/or containers 216 (indexed by integers from 1 to R, for R≥1).

Each client process $218_q$ (q an integer, where 1≤q≤Q) may run directly on an operating system/hypervisor 212 or may run in a virtual machine and/or container $216_r$ (r an integer, where 1≤r≤R) serviced by the OS and/or hypervisor 212.

The DESS driver 221 is operable to receive/intercept local file system commands (e.g., POSIX commands) and generate corresponding file system requests (e.g., read, write, create, make directory, remove, remove directory, link, etc.) to be transmitted onto the interconnect 101. In some instances, the file system requests transmitted on the interconnect 101 may be of a format customized for use with the DESS front end 220 and/or DESS back end 222 described herein. In some instances, the file system requests transmitted on the interconnect 101 may adhere to a standard such as Network File System (NFS), Server Message Block (DMB), Common Internet File System (CIFS), and/or the like.

Each DESS front end instance $220_s$ (s an integer, where 1≤s≤S if at least one front end instance is present on compute node $104_n$) provides an interface for routing file system requests to an appropriate DESS back end instance (running on a DESS node), where the file system requests may originate from one or more of the client processes 218, one or more of the VMs and/or containers 216, and/or the OS and/or hypervisor 212. Each DESS front end instance $220_s$ may run on the processor of chipset 204 or on the processor of the network adaptor 208. For a multi-core processor of chipset 204, different instances of the DESS front end 220 may run on different processing cores.

Figure 3:
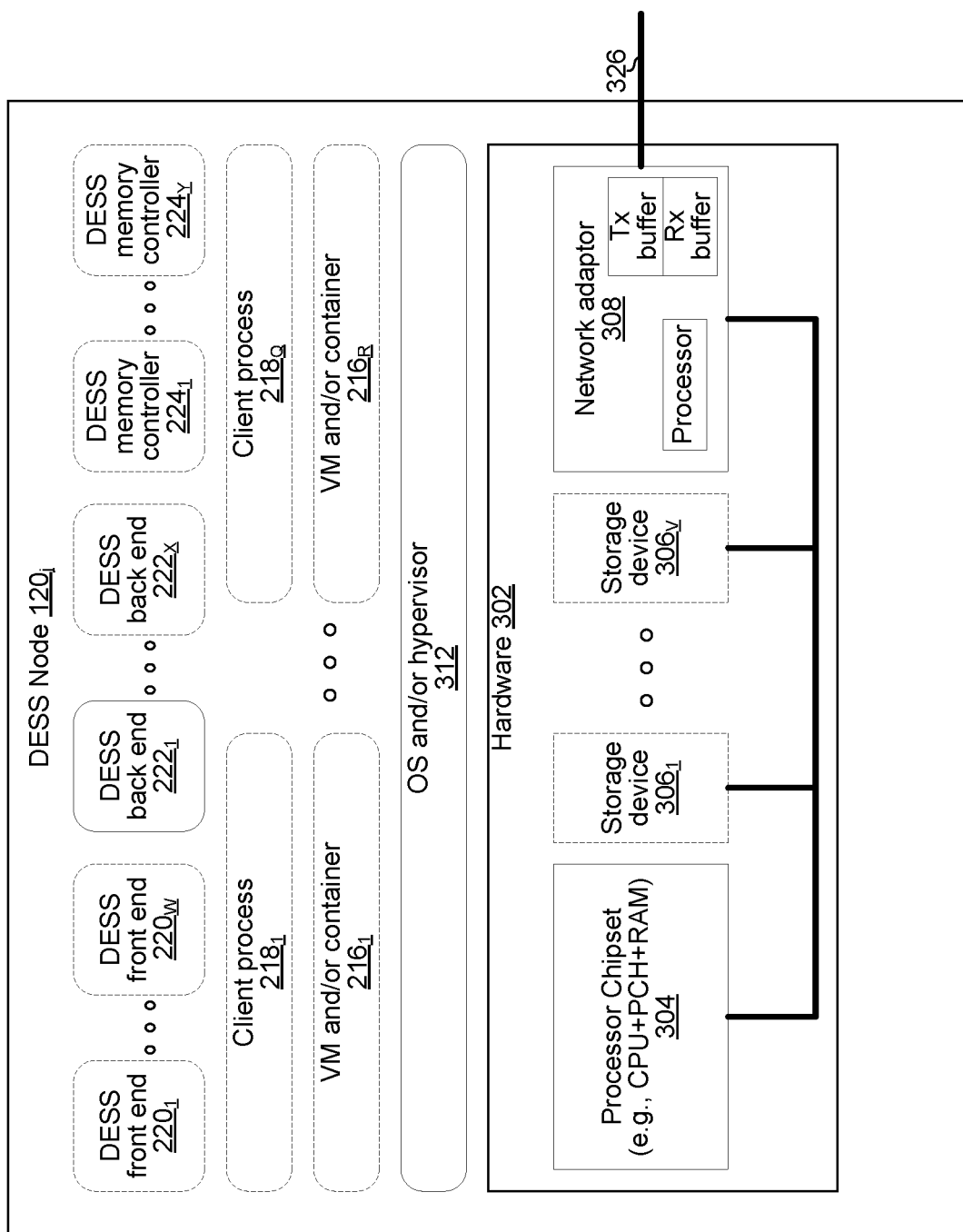
FIG. 3 illustrates various example configurations of a distributed electronic storage system node in accordance with aspects of this disclosure.

FIG. 3 shows various example configurations of a distributed electronic storage system node in accordance with aspects of this disclosure. The example DESS node $120_j$ comprises hardware 302 that, in turn, comprises a processor chipset 304, a network adaptor 308, and, optionally, one or more storage devices 306 (indexed by integers from 1 to W, for W≥1).

Each storage device $306_p$ (p an integer, where 1≤p≤P if at least one storage device is present) may comprise any suitable storage device for realizing a tier of storage that it is desired to realize within the DESS node $120_j$.

The processor chipset 304 may be similar to the chipset 204 described above with reference to FIG. 2. The network adaptor 308 may be similar to the network adaptor 208 described above with reference to FIG. 2 and may interface with other nodes of LAN 100 via link 326.

Software running on the hardware 302 includes at least: an operating system and/or hypervisor 212, and at least one of: one or more instances of DESS front end 220 (indexed by integers from 1 to W, for W≥1), one or more instances of DESS back end 222 (indexed by integers from 1 to X, for X≥1), and one or more instances of DESS memory controller 224 (indexed by integers from 1 to Y, for Y≥1). Additional software that may optionally run on the hardware 302 includes: one or more virtual machines (VMs) and/or containers 216 (indexed by integers from 1 to R, for R≥1), and/or one or more client processes 318 (indexed by integers from 1 to Q, for Q≥1). As mentioned above, DESS processes and client processes may share resources on a DESS node.

The client processes 218 and VM(s) and/or container(s) 216 are as described above with reference to FIG. 2.

Each DESS front end instance $220_w$ (w an integer, where 1≤w≤W, if at least one front end instance is present on DESS node $120_j$) provides an interface for routing file system requests to an appropriate DESS back end instance (running on the same or a different DESS node), where the file system requests may originate from one or more of the client processes 218, one or more of the VMs and/or containers 216, and/or the OS and/or hypervisor 212. Each DESS front end instance $220_w$ may run on the processor of chipset 304 or on the processor of the network adaptor 308. For a multi-core processor of chipset 304, different instances of the DESS front end 220 may run on different processing cores.

Each DESS back end instance $222_x$ (x an integer, where $1 \leq x \leq X$, if at least one back end instance is present on DESS node $120_j$) services the file system requests that it receives and carries out tasks to otherwise manage the DESS (e.g., load balancing, journaling, maintaining metadata, caching, moving of data between tiers, removing stale data, correcting corrupted data, etc.) Each DESS back end instance $222_x$ may run on the processor of chipset 304 or on the processor of the network adaptor 308. For a multi-core processor of chipset 304, different instances of the DESS back end 222 may run on different processing cores.

Each DESS memory controller instance $224_u$ (u an integer, where $1 \leq u \leq U$, if at least DESS memory controller instance is present on DESS node $120_j$) handles interactions with a respective storage device 306 (which may reside in the DESS node 120j or another DESS node 120 or a storage node 106). This may include, for example, translating addresses, and generating the commands that are issued to the storage device (e.g., on a SATA, PCIe, or other suitable bus). Thus, the DESS memory controller instance $224_u$ operates as an intermediary between a storage device and the various DESS back end instances of the DESS.

Figure 4:
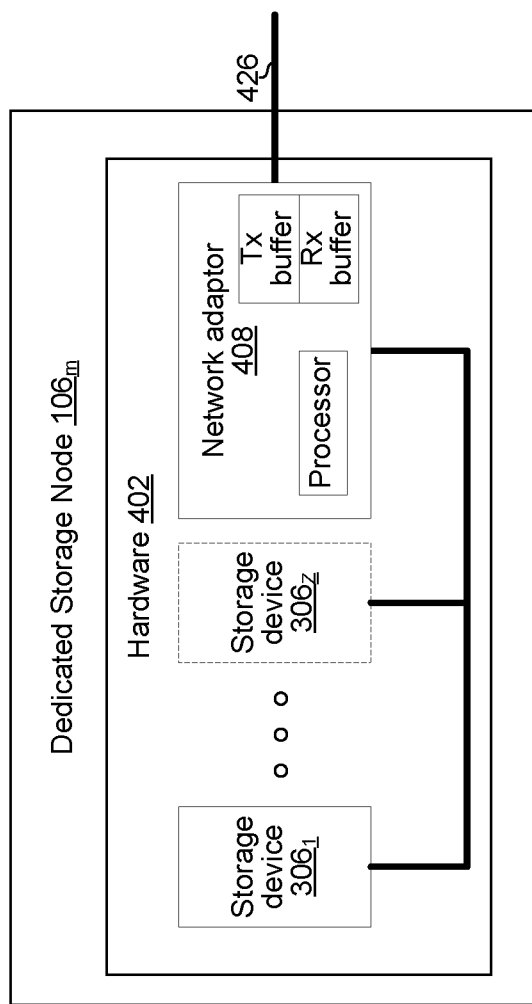
FIG. 4 illustrates various example configurations of a dedicated storage node in accordance with aspects of this disclosure.

FIG. 4 illustrates various example configurations of a dedicated storage node in accordance with aspects of this disclosure. The example dedicated storage node $106_m$ comprises hardware 402 which, in turn, comprises a network adaptor 408 and at least one storage device 306 (indexed by integers from 1 to Z, for $Z \geq 1$). Each storage device $306_z$ may be the same as storage device $306_w$ described above with reference to FIG. 3. The network adaptor 408 may comprise circuitry (e.g., an arm based processor) and a bus (e.g., SATA, PCIe, or other) adaptor operable to access (read, write, etc.) storage device(s) $406_1$-$406_z$ in response to commands received over network link 426. The commands may adhere to a standard protocol. For example, the dedicated storage node $106_m$ may support RDMA based protocols (e.g., Infiniband, RoCE, iWARP etc.) and/or protocols which ride on RDMA (e.g., NVMe over fabrics).

In an example implementation, tier 1 memory is distributed across one or more storage devices 306 (e.g., FLASH devices) residing in one or more storage node(s) 106 and/or one or more DESS node(s) 120. Data written to the DESS is initially stored to Tier 1 memory and then migrated to one or more other tier(s) as dictated by data migration policies, which may be user-defined and/or adaptive based on machine learning.

Figure 5A:
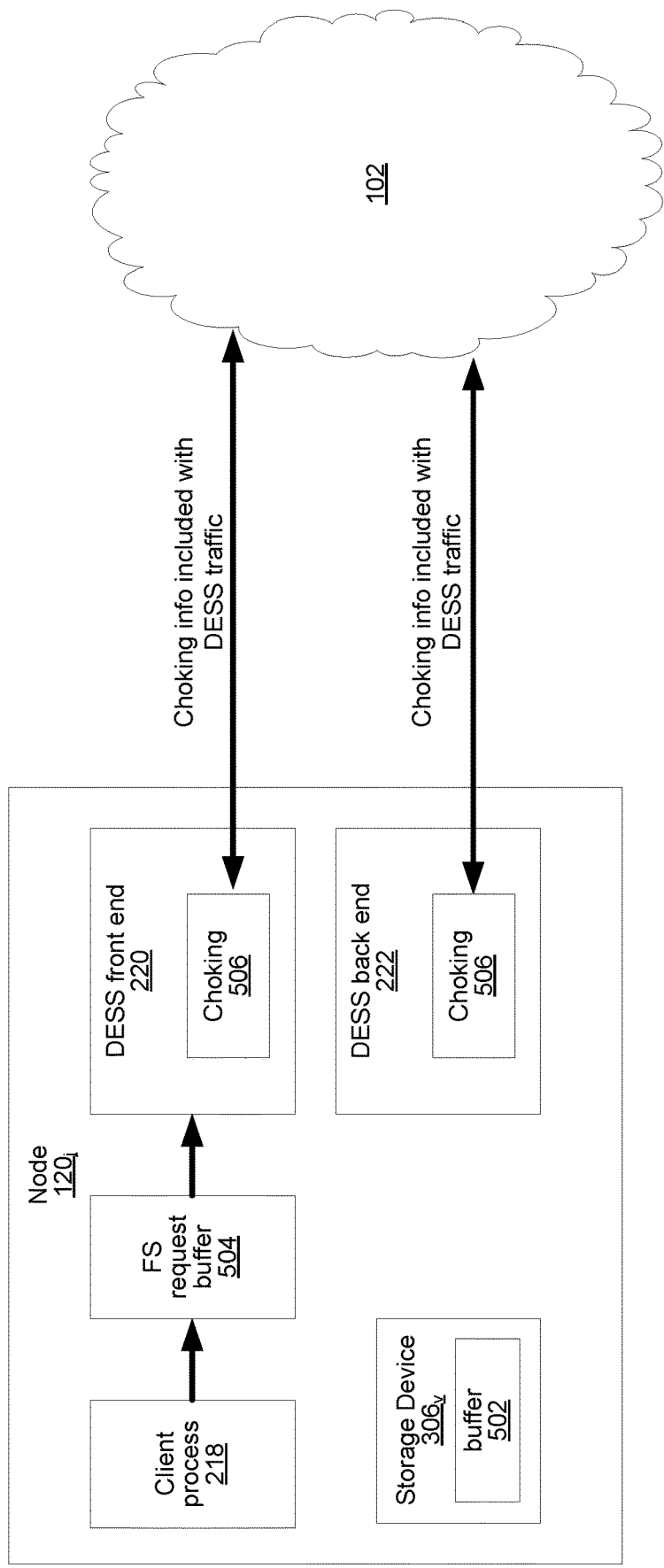
FIG. 5A illustrates an example implementation of a node configured for congestion mitigation in accordance with aspects of this disclosure.

FIG. 5A illustrates a first example implementation of a node configured for congestion mitigation in accordance with aspects of this disclosure. The example DESS node $120_I$ in FIG. 5A is configured to implement a client process 218, a file system request buffer 504, an instance of DESS front end 220, an instance of DESS backend 222, a storage device 306 comprising a buffer 502, and one or more file system choking process(es) 506.

The client process 218 may be as described above with reference to FIGS. 1-4. The client process 218 submits file system requests to the DESS and those file system requests are buffered in file system request buffer 504.

The file system request buffer 504 may, for example, reside in memory of the chipset 204 (FIG. 2) or 304 (FIG. 3). In the example implementation shown, the node $102_i$ comprises only a single buffer 504. In an example implementation in which the DESS comprises a plurality of distributed file systems which are mounted on the node $120_l$, the node $120_l$ may comprise a plurality of buffers 504—one for each of the mounted file systems.

The buffer 502 may, for example, comprise RAM within the storage device $306_v$. The buffer 502 is used for buffering data being read from and/or written to nonvolatile storage (e.g., FLASH) of the storage device 306.

The file system choking process(es) 506 control the rate at which the file system requests in the buffer 504 are fetched by the front end 220 so as to manage congestion in (and, thus, quality of service provided by) the DESS.

In operation, the front end fetches batches of file system requests from the buffer 504, determines which back end instance(s) 222 should service the request(s), generates the appropriate DESS message(s) for conveying the request(s) to the back end(s) 222, and transmits DESS message(s) to the determined back end(s) 222 via the network 102. The back end(s) 222 receive the DESS message(s) and perform the necessary operations to carry out the file system request (typically involving reading and/or writing data and/or metadata from/to one or more storage device(s) 306). The rate at which the file system requests are fetched from the buffer 504 is controlled by the choking process(es) 506. In an example implementation (further described below with reference to FIGS. 9A-9D), this comprises the choking process(es) 506 determining a choking level and then adjusting one or more settings based on the determined choking level. The one or more settings may comprise, for example: a batch timing setting (i.e., the timing of when file system requests are fetched from the buffer 504), and a batch size setting (i.e., how file system requests are fetched from the buffer 504 at a time). The batch timing setting may, for example, be an interval duration and/or an offset relative to some reference time.

The control of the rate at which file system requests are fetched may be based on information about the state of the DESS. The state information may be based on the load on (i.e., level of usage of) resources of the DESS. The load may be a most-recently measured/recorded load or may be a predicted load based on historical measurement/recordings (for the same DESS and/or other DESSs) being input to a prediction algorithm Such resources may include resources of the node $120_I$ (DESS resources "local" to node $120_l$). Such resources may also include similar resources of other nodes 104, $120_j$, and/or 106 of the DESS (DES S resources that are "remote" from the perspective of node $120_l$). Information about the loads on remote resources may be determined from DESS messages received from other nodes of the DESS. Similarly, the node $120_l$ may transmit DESS messages which indicate the loads on its resources. Such DESS messages may contain a direct representation of load on one or more resources and/or may contain values calculated based on the load no one or more resources. Examples of such values calculated based on the resource load values are described below with reference to FIGS. 9A-9D. This bidirectional exchange of choking information gives choking processes 506 throughout the DESS a more holistic view of the state of the DESS, which enables them to more optimally control the rate at which they submit file system requests to the DESS as compared to if they had to control the rate based only on their respective local resource loads.

Resources for which resource load may be monitored include one or more of the following: storage device, CPU, network, and memory. A load on a storage device may, for example, be represented by a single value determined from depth of buffer 502, or represented by two values where the first is determined from depth of read buffer 710 and the second is determined from depth of write buffer 712. A load on a CPU may, for example, be represented by a value corresponding to a running average of percentage of available cycles per second being used. A load on a network adaptor or link may, for example, be represented by a single value determined from depth of transmit and/or receive buffers, or represented by two values where the first is determined from depth of a transmit buffer and the second is determined from depth of a receive buffer. A load on a memory may, for example, be represented by a single value determined from the amount of used (or free) memory.

Details of example operation of the implementation of FIG. 5A will now be described with reference to the flowchart of FIG. 5B.

Figure 5B:
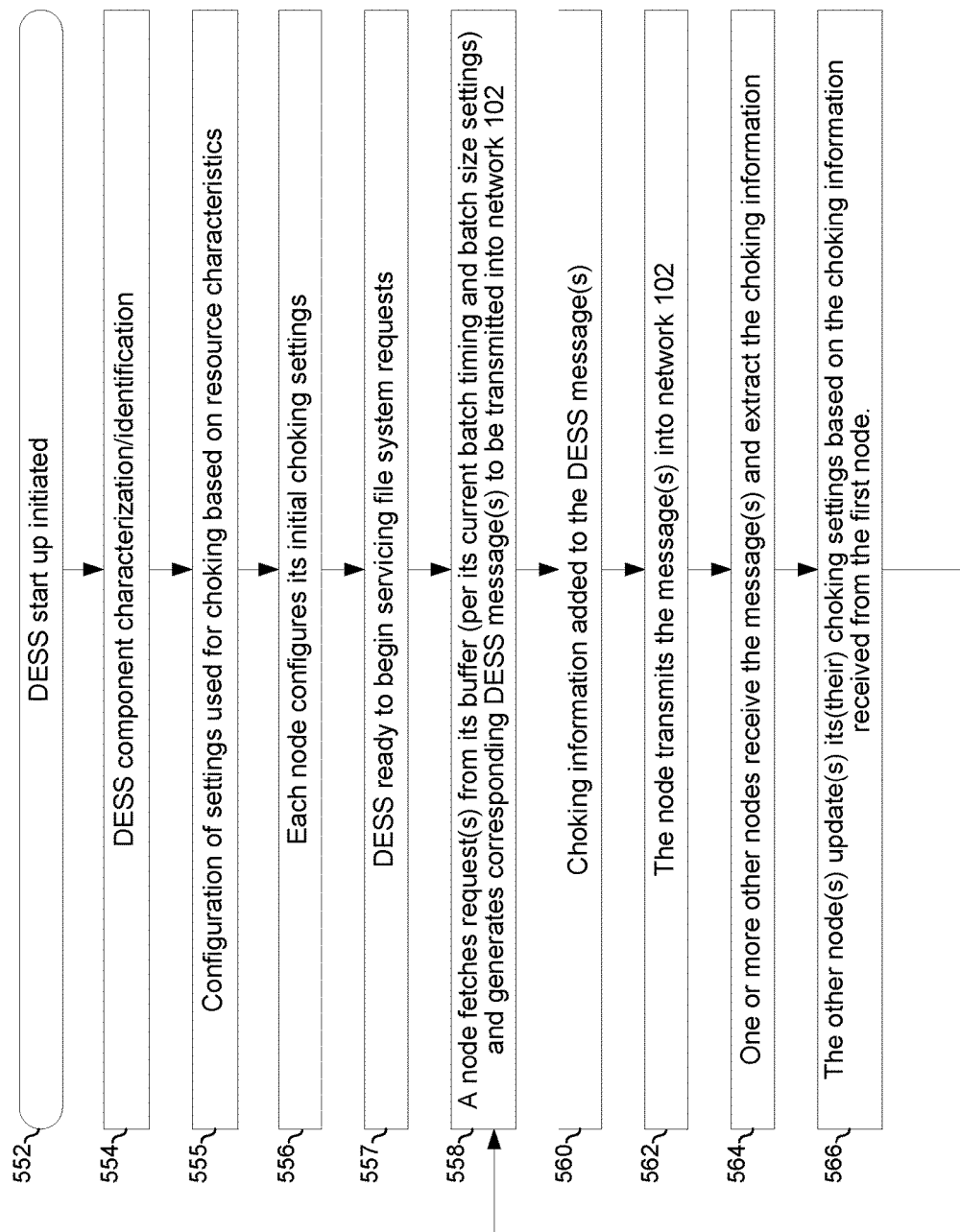
FIG. 5B is a flowchart illustrating an example process for congestion mitigation performed by the node of FIG. 5A.

The process of FIG. 5B begins with block 552 in which the DESS begins its startup/initialization process (e.g., after power up or reset of the node(s) across which it is distributed).

In block 554, various resources (e.g., CPU(s), memory, network adaptor(s), and storage device(s)) of the DESS are characterized. For example, a choking process 506 on each node of the DESS may determine (e.g., through one or more commands supported by the node's operating system) the identity (e.g., manufacturer, model number, serial number, and/or the like) of local resources, and use those identities to retrieve corresponding characteristics from a resource characteristics database (e.g., stored locally in the network 102 and/or accessible via the Internet). For a resource such as a CPU, such characteristics may include, for example, clock speed, cache size, cache speed, number of cores, and/or the like. For a resource such as memory, such characteristics may include, for example, size of memory, speed of memory, and/or the like. For a network adaptor such characteristics may include, for example, latency, maximum throughput, buffer size, and/or the like. For a resource such as a storage device such characteristics may include, for example, size of its buffer 502, write speed (e.g., in input/output operations per second (IOPS)) as a function of the depth (i.e., fill level) of its buffer 502, read speed as a function of the depth of its buffer 502, and/or the like. In instances that a record is not found in the database for an identified resource, a choking process 506 may perform a characterization of the resource before proceeding to block 556. As an example, test reads and/or writes may be issued to a storage device 306 and the resulting read and/or write speed as a function of the depth of its buffer 502 may be monitored and then used to generate a characterization which is then stored to the database.

In block 555, one or more settings used by the choking process(es) 506 are configured based on the resource characteristics determined in block 554. As an example (further described below with reference to FIGS. 9A-9D), one or more functions may be used for mapping resource load values to congestion contribution values, mapping congestion contribution values to a choking level, and mapping a choking level to values for a batch timing setting and a batch size setting. Such function(s) may have one or more parameters which may be set based on the characteristics determined in block 554.

In block 556, each node of the DESS determines its initial choking settings (e.g., initial batch timing and batch size settings). The initial choking settings may, for example, be set empirically by a DESS administrator and/or may be set automatically by the choking process 506 based on historical settings used in this DESS and/or other DESSs (e.g., as adapted by a learning algorithm).

In block 557, the DESS is ready to begin servicing file system requests.

In block 558, a front end 220 of a DESS node 120$_j$ (Note: the node 120$_j$ may be a different node on different iterations through the loop comprising blocks 558-566) fetches file system request(s) from its buffer 504 based on its choking settings (e.g., values of batch timing and batch size), and generates one or more corresponding DESS message(s) (e.g., message(s) to convey the file system requests to the appropriate back end(s) 222).

In block 560, a choking process 506 of the node 120$_j$ inserts choking information into the DESS message(s).

In block 562, the node 120$_j$ transmits the DESS message(s) into the network 102.

In block 564, other node(s) of the DESS receive the DESS message(s) and extract(s) the choking information.

In block 566, the other node(s) update their choking settings based on the choking information from node 120$_j$ and based on their most-recent load information for other resources.

Figure 6:
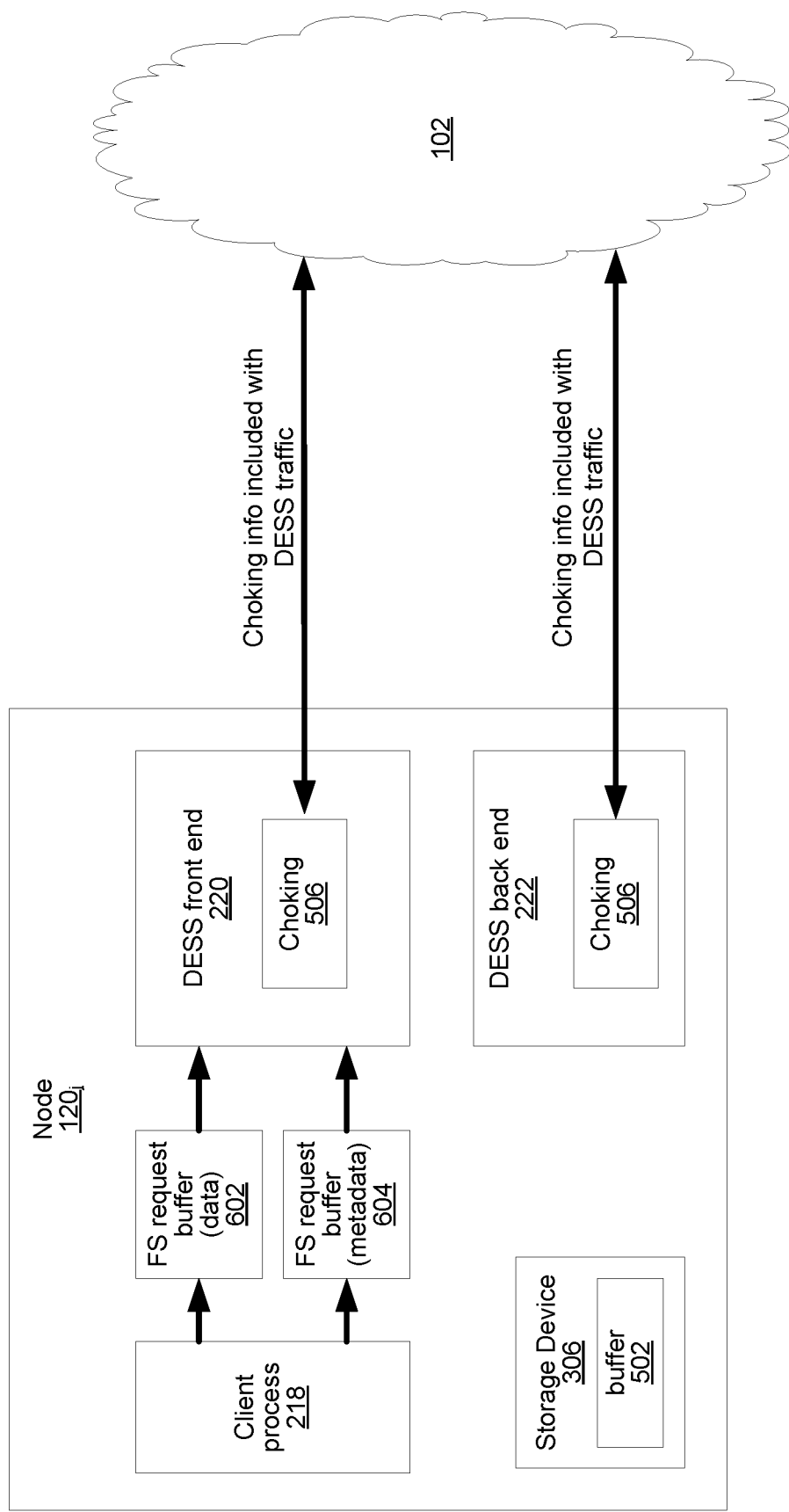
FIG. 6 illustrates another example implementation of a node configured for congestion mitigation in accordance with aspects of this disclosure.

FIG. 6 illustrates another example implementation of a node configured for congestion mitigation in accordance with aspects of this disclosure. FIG. 6 is largely the same as FIG. 5A except the node 120$_j$ in FIG. 6 manages different types of file system requests separately. Specifically, file system requests which require reading and/or writing data to/from the distributed file system are managed separately from file system requests which require reading and/or writing metadata to/from the distributed file system. The separate management may be realized, for example, using two separate FIFO buffers 602 and 604 as shown, but may also be realized in other ways such as using a single random access buffer.

In the example implementation shown, the node 102$_j$ comprises only a single buffer 602 and a single buffer 604. In an example implementation in which the DESS comprises a plurality of distributed file systems which are mounted on the node 120$_j$, the node 120$_j$ may comprise a plurality of buffers 602 (one for each file system of the DESS mounted on node 120$_j$) and a plurality of buffers 604 (one for each file system of the DESS mounted on node 120$_j$).

Operation of the example node 120$_j$ of FIG. 6 is similar to as described with reference to FIG. 5A, with the rate at which requests are fetched from buffer 602 being controlled separately from rate at which requests are fetched from buffer 604. For example, choking process(es) 506 of node 120$_j$ may control the rate at which file system data requests are fetched from buffer 602 by controlling a data batch timing setting ($T_D$) and a data batch size setting ($S_D$), and may control the rate at which file system metadata requests are fetched from buffer 604 by controlling a metadata batch timing setting ($T_M$) and a metadata batch size setting ($S_M$). The ability to separately control the rate of file system data requests and file system metadata requests is advantageous at least because, in many cases, file system metadata requests are more important than file system data requests because file system metadata requests enable, for example: querying the status of the DESS; making some changes so to optimize in-process file system operations. Further, metadata requests are often run by interactive "human generated" sessions, so getting them to execute quicker results in a higher level of user satisfaction. Accordingly, in some instances when the DESS is getting congested, the choking process(es) 506 may reduce the rate at which requests are fetched from buffer 602 sooner and/or more aggressively than the rate at which requests are fetched from buffer 604. In some instances this may lead to a scenario in which file system metadata requests, but not file system data requests, are fetched during a determined time interval.

Figure 7:
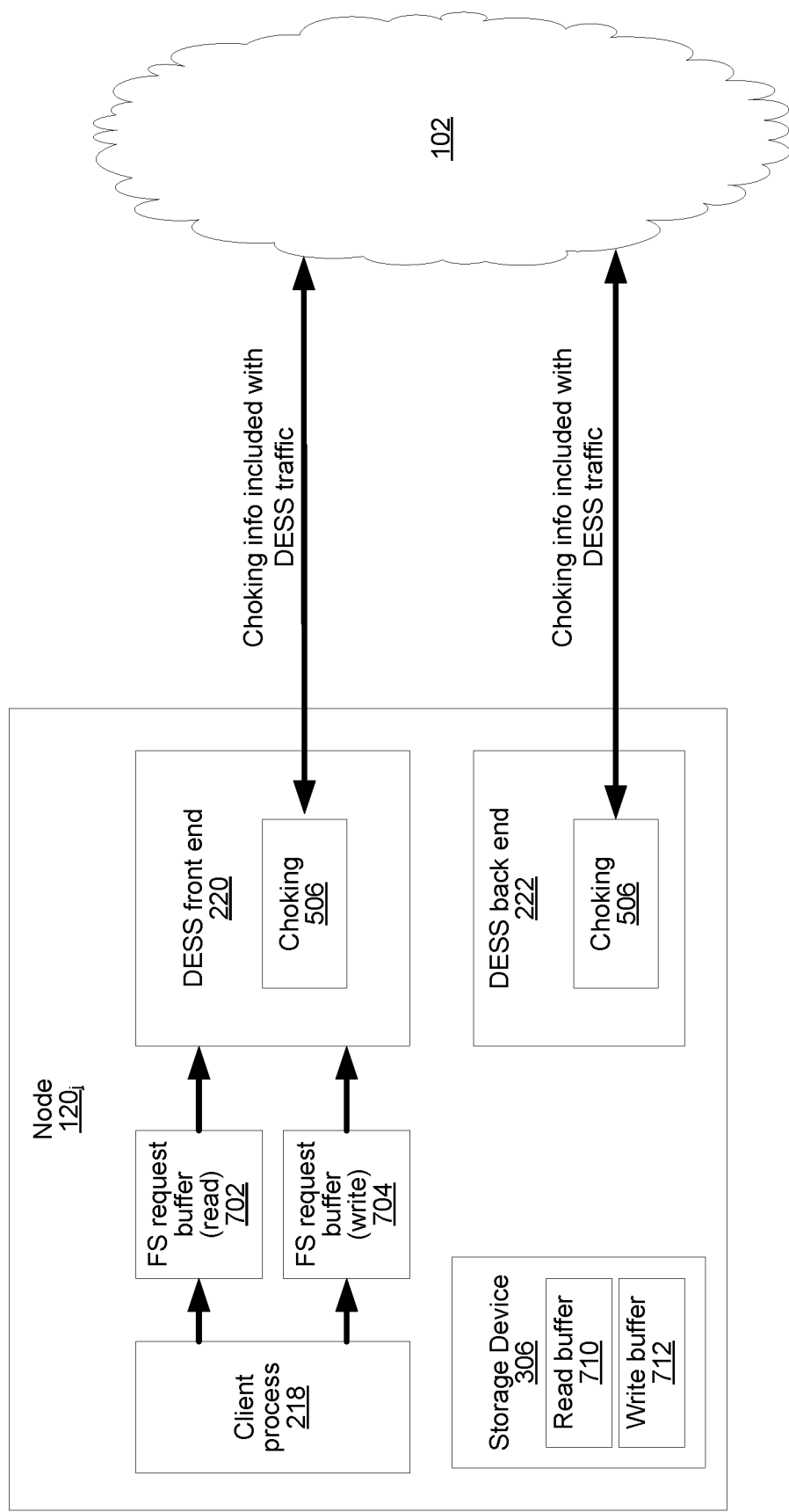
FIG. 7 illustrates another example implementation of a node configured for congestion mitigation in accordance with aspects of this disclosure.

FIG. 7 illustrates another example implementation of a node configured for congestion mitigation in accordance with aspects of this disclosure. FIG. 7 is largely the same as FIG. 6 except, in FIG. 7, the separate management is of file system read requests and file system write requests, rather than of file system data requests and file system metadata requests. The separate management may be realized, for example, using two separate FIFO buffers 702 and 704 as shown, but may also be realized in other ways such as using a single random access buffer.

In the example implementation shown, the node $102_j$ comprises only a single buffer 702 and a single buffer 704. In an example implementation in which the DESS comprises a plurality of distributed file systems which are mounted on the node $120_l$, the node $120_l$ may comprise a plurality of buffers 702 (one for each file system of the DESS mounted on node $120_j$) and a plurality of buffers 704 (one for each file system of the DESS mounted on node $120_j$).

Operation of the example node $120_j$ of FIG. 7 is similar to as described with reference to FIG. 6, with the rate at which requests are fetched from buffer 702 being controlled separately from choking settings for buffer 704. For example, choking process(es) 506 of node $120_j$ may control the rate at which file system data write requests are fetched from buffer 702 by separately controlling a write timing setting ($T_W$), a write batch size setting ($S_W$), a read timing setting ($T_R$), a read batch size setting ($S_R$), metadata batch timing setting ($T_M$), and a metadata batch size setting ($S_M$). The ability to separately control the rate of file system read requests and file system write requests is advantageous at least because, for example, write operations and read operations may use different resources which may become congested at different rates. For example, it may occur at some particular time that there are many read operations pending and thus buffer 710 of storage device 306 cannot accept any more read requests, but buffer 712 has capacity to accept write requests (and resources of the storage device 306 are available to begin working on such write requests). Without separate management of file system read requests and file system write requests, write requests in the buffer 504 (FIG. 5) may be blocked by read requests waiting for resources in storage device 306 to free up. Similarly, it may occur at some particular time that there are many write operations pending and thus buffer 712 of storage device 306 cannot accept any more write requests, but buffer 710 has capacity to accept read requests (and resources of the storage device 306 are available to begin working on such read requests). Without separate management of file system read requests and file system write requests, read requests in the buffer 504 (FIG. 5) may be blocked by read requests waiting for resources in storage device 306 to free up. The implementation of FIG. 7 avoids this problem and permits the DESS to begin working on one or more pending write requests.

Figure 8:
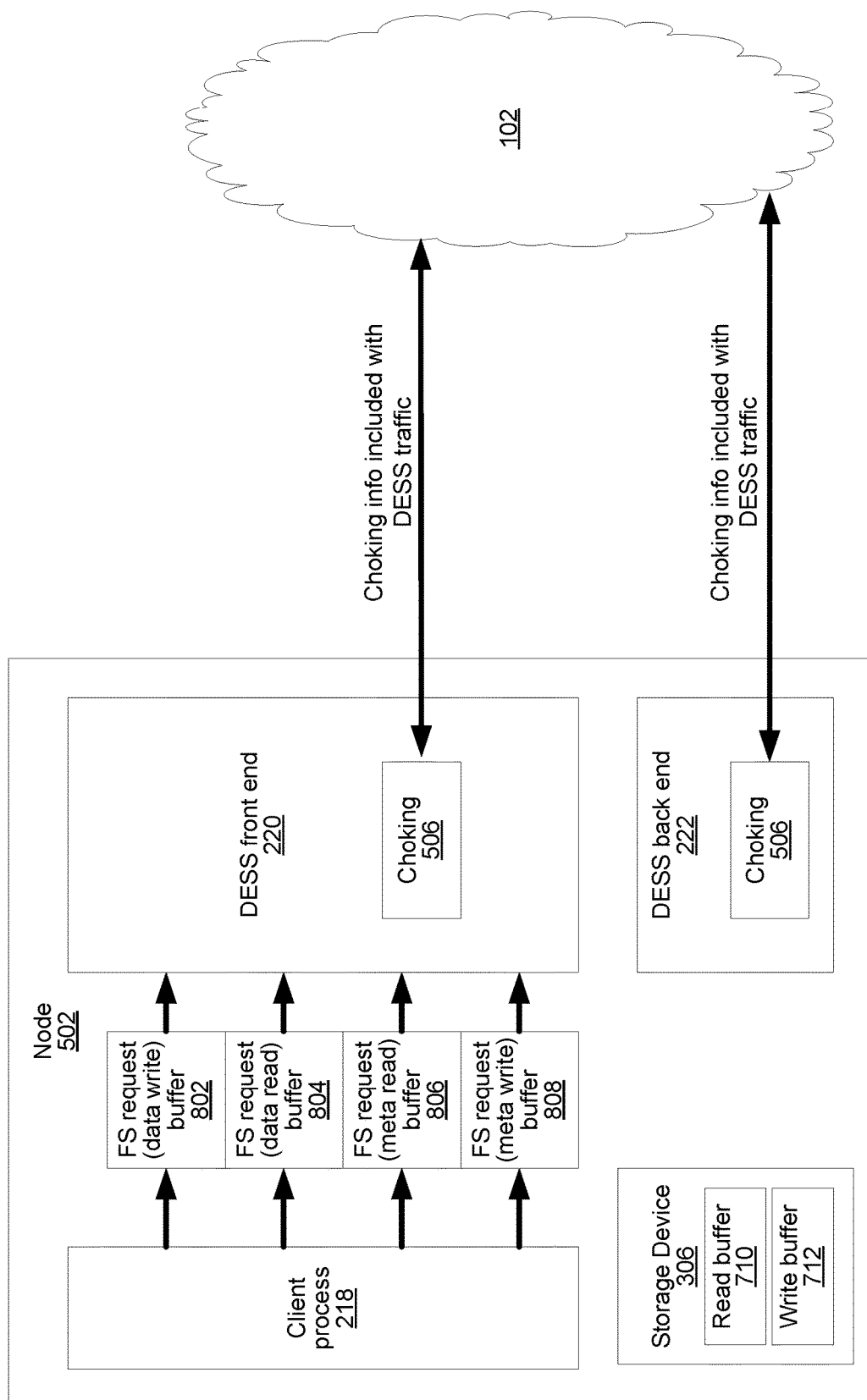
FIG. 8 illustrates another example implementation of a node configured for congestion mitigation in accordance with aspects of this disclosure.

FIG. 8 illustrates another example implementation of a node configured for congestion mitigation in accordance with aspects of this disclosure. FIG. 8 can be viewed as a combination of FIGS. 6 and 7.

Figure 9A:
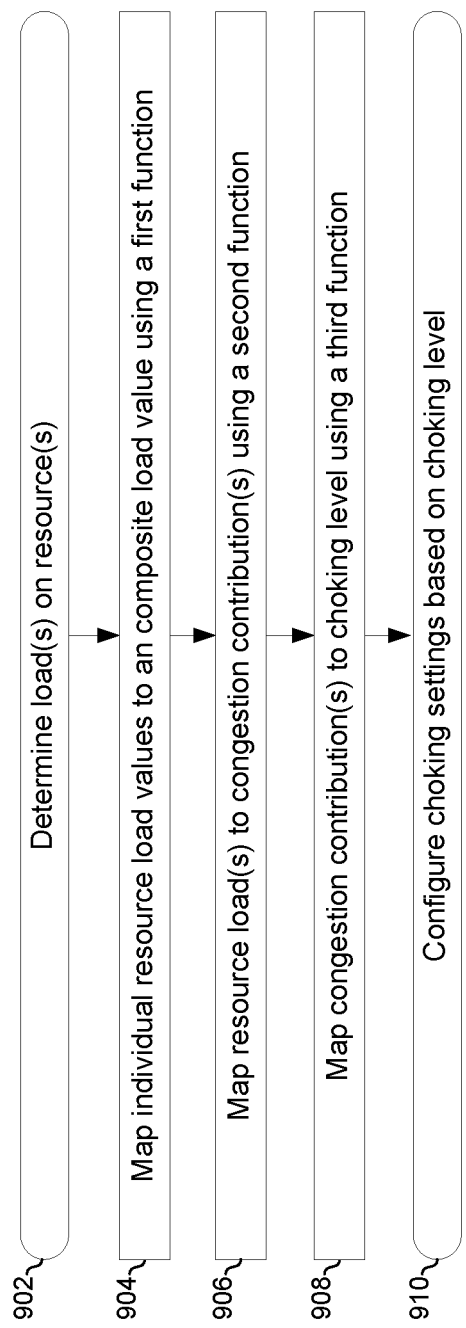
FIG. 9A is a flowchart illustrating an example method of configuring choking settings based on resource load.
Figure 9B:
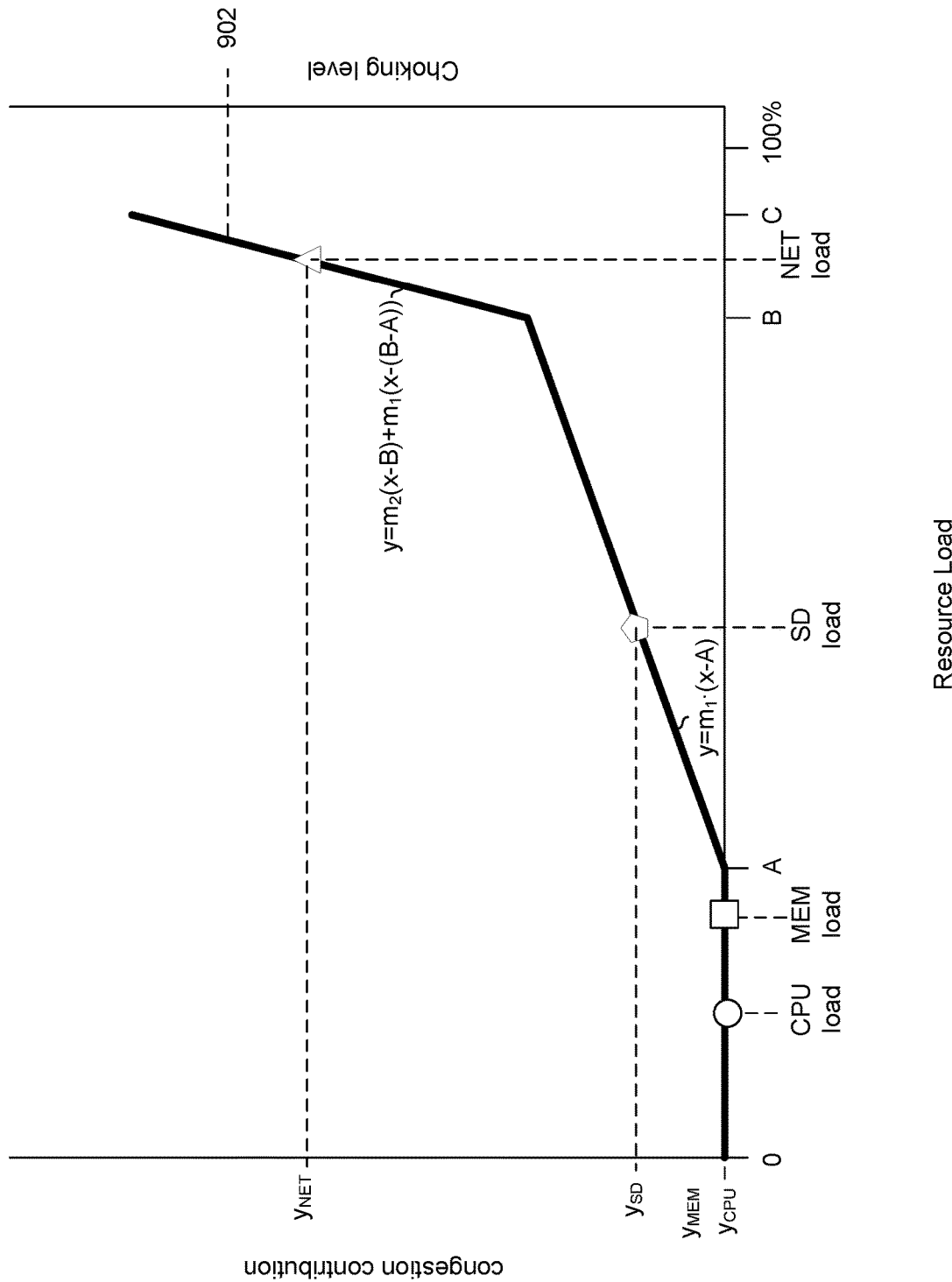
FIGS. 9B-9D illustrate examples of application of the method of FIG. 9A.
Figure 9C:
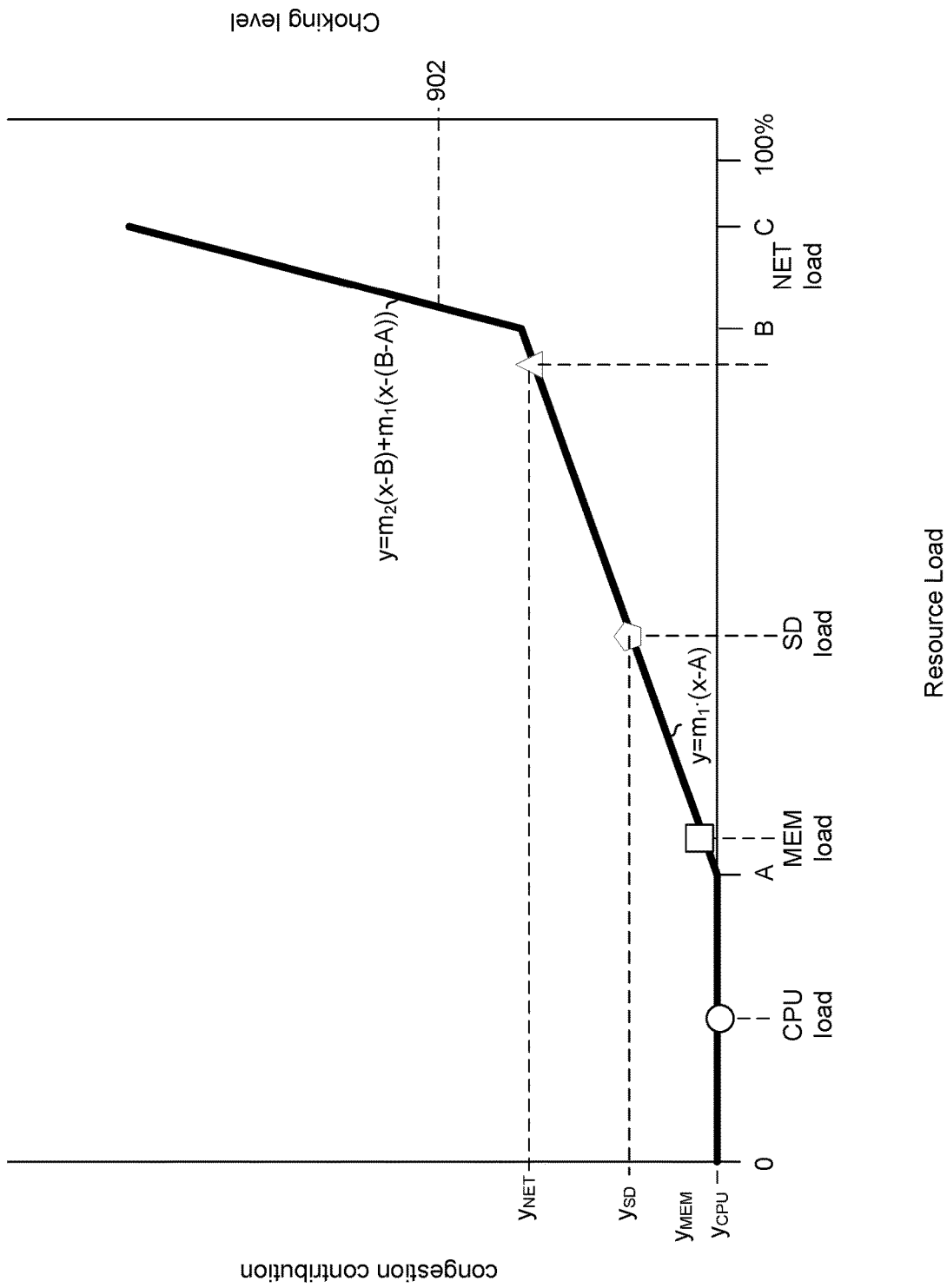
Figure 9D:
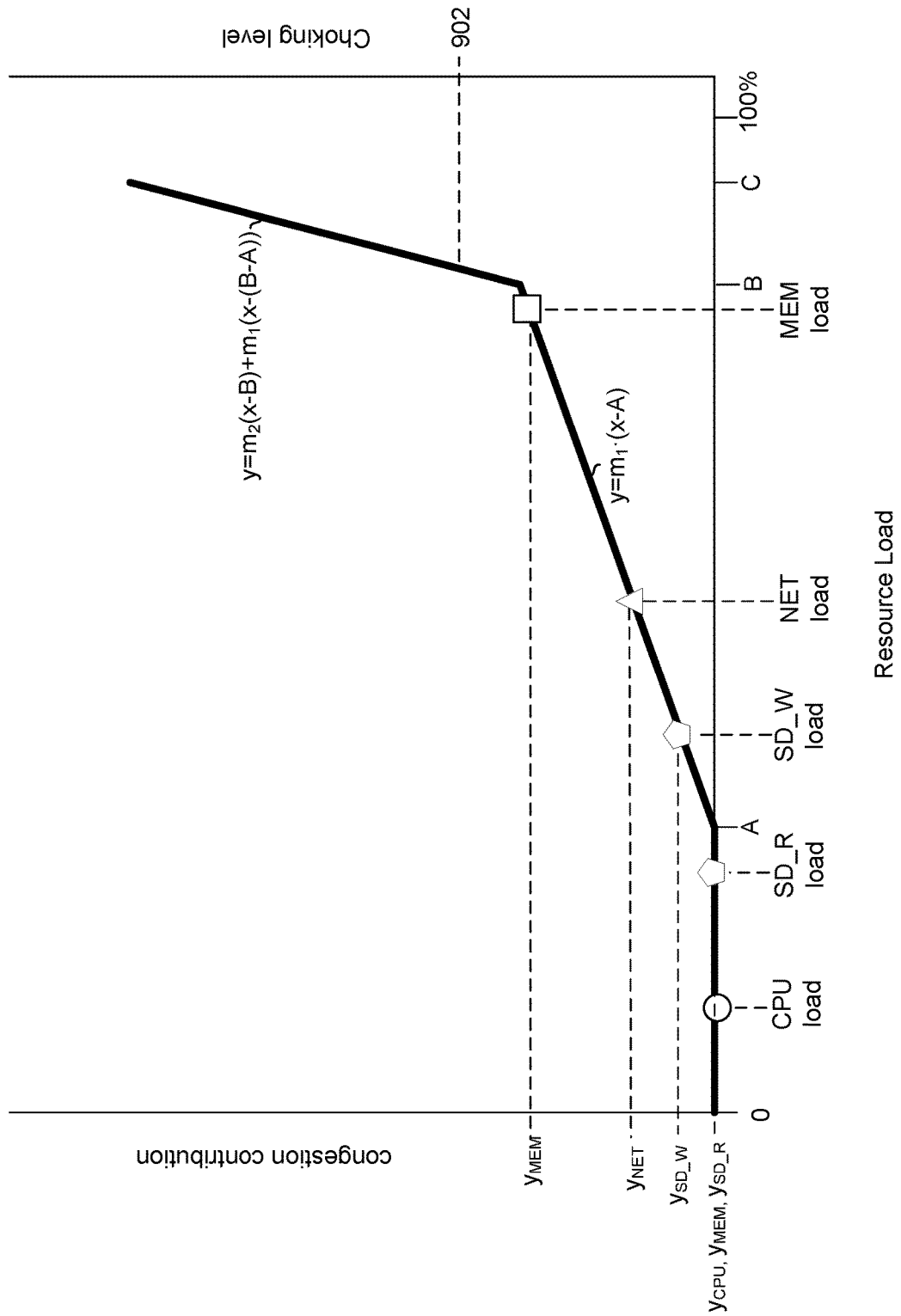

FIG. 9A is a flowchart illustrating an example method of configuring choking settings based on resource load. The process begins in block 902 in which node $102_j$ determines the load on one or more local and/or remote resources of the DESS. As described above, this may include each node determining the load on its local resources (this may be a current measurement/estimation or prediction for some time in the future) and including this information (or derivatives thereof) in DESS messages sent to other nodes. The resource loads may, for example, be represented as a numerical value (e.g., on a scale of 0 to 7, using 3 bits).

In block 904, the node $102_j$ maps the individual load values for each resource to a composite load value using a first function. For example, in FIGS. 9B-9D, the node $102_j$ may generate a CPU load value, a memory load value, a storage device load value, and a network load value; and may also receive one or more CPU load values, one or more memory load values, one or more storage device load values, and one or more network load values from other nodes of the DESS. The node $102_j$ may then maps the two or more CPU load values to a composite CPU load value, the two or more memory load values to a composite memory load value, the two or more storage device load values to a composite storage device load value, and the two or more network load values to a composite network load value. The first function may be, for example, a sum, an average, a weighted average (e.g., load values determined more recently given more weight than older values), or any other suitable function. These composite load values are shown along the X axis in FIGS. 9B-9D.

In block 906, the node $102_j$ maps each composite resource load value to a corresponding congestion contribution values using a second function. Any suitable function may be used. In the example implementations illustrated in FIGS. 9B-9D, the second function is the following piecewise linear function:

$$y = \begin{cases} 0, \text{ for } x < A \\ m_1 \cdot (x - A), \text{ for } A \leq x \leq B \\ m_2 \cdot (x - B) + m_1 \cdot (x - (B - A)), \text{ for } x > B \end{cases}$$

One or more of the variables m1, m2, A, and B may be determined (e.g., preset by a DESS administrator and/or adapted using a learning algorithm) based on the determined type (e.g., CPU, memory, network, and storage device) of DESS resources. Although the same function is shown as applying to all of the composite load values, this need not be the case. For example, one or more of the variables may take on first value(s) (which may vary based on determined characteristics as, for example, described above with reference to FIGS. 5A and 5B) when mapping the composite network load value and second value(s) (which may vary based on determined characteristics as, for example, described above with reference to FIGS. 5A and 5B) when mapping the composite storage device load value.

One or more of the variables m1, m2, A, and B may be determined based on characteristics of DESS resources (and may vary over time as the characteristics vary). For example, one or more of the variables may take on first value(s) for a first file system distributed across storage device(s) 306 having first characteristics and second value(s) for a second file system distributed across storage device(s) 306 having second characteristics. As another example, the variables may adapt over time as the resources age (e.g., as a storage device ages its characteristics may change).

In block 908, the congestion contributions are mapped to a choking level using a third function. The third function may be, for example, a sum, an average, a weighted average, or any other suitable function. In the example implementation of FIGS. 9B-9D, the third function is the sum of the congestion contribution levels. The third function may be determined based on characteristics of DESS resources and may adapt as the characteristics change over time.

In block 910, the congestion settings, such as one or more batch timing settings and/or one or more batch size settings, are configured based on the determined congestion level. For example, congestion level may be mapped to such settings using a lookup table or one or more fourth functions. The lookup table or fourth function(s) may be set by a DESS administrator and/or adapt based on a learning algorithm (e.g., set and/or adapted based on DESS characteristics and/or changes in the characteristics over time).

In various example implementations, changes to choking settings, changes to function variables, and/or changes to any other configuration changes may be limited by hysteresis settings (which themselves may be user-defined and/or adaptive) and/or may updated in a moving average fashion so as to reduce jitter, oscillations, etc. in the values.

Figure 10:
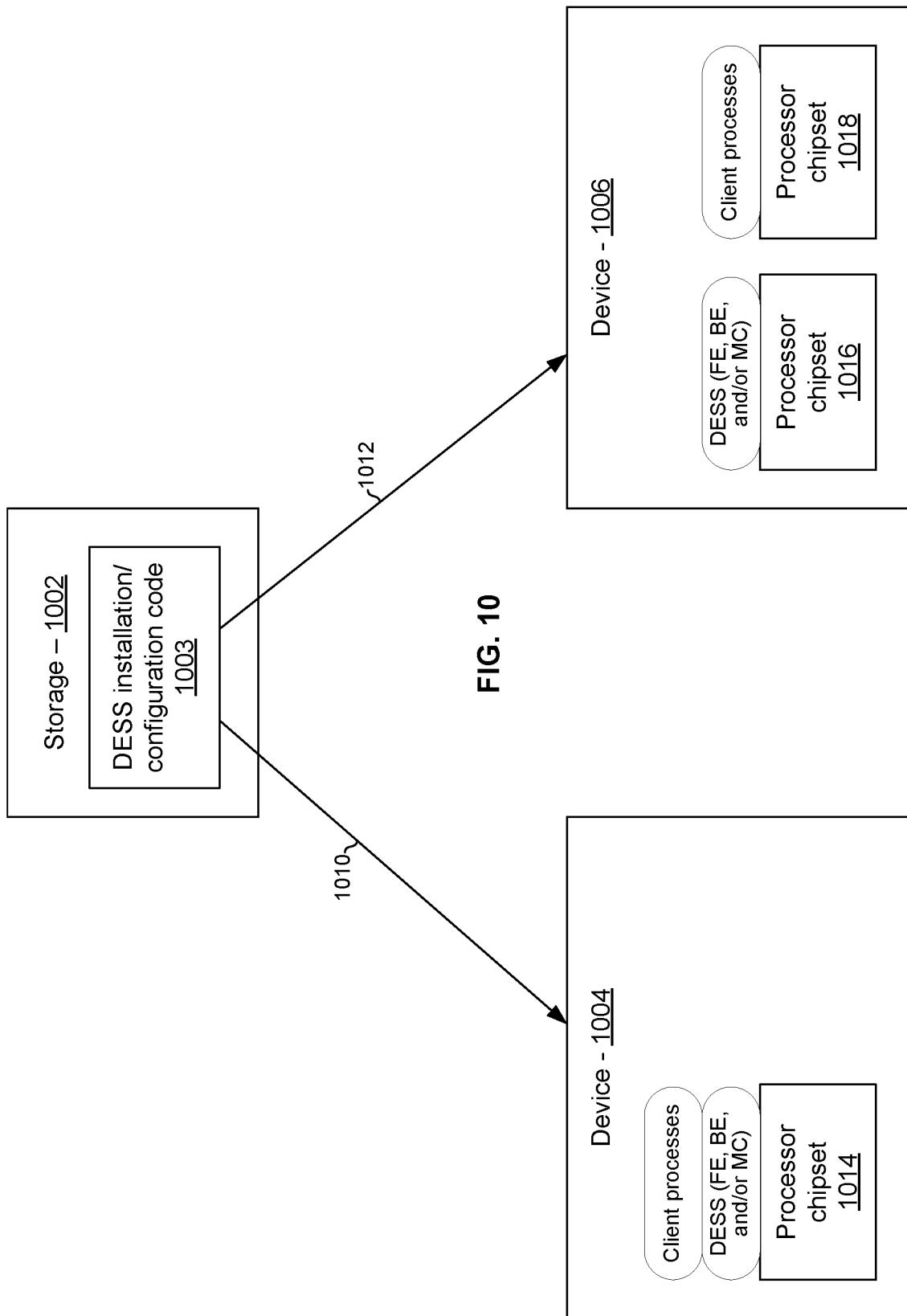
FIG. 10 is a block diagram illustrating configuration of a DESS from a non-transitory machine-readable storage.

FIG. 10 is a block diagram illustrating configuration of a DESS from a non-transitory machine-readable storage media. Shown in FIG. 10 is non-transitory storage 1002 on which resides code 1003. The code is made available to computing devices 1004 and 1006 (which may be compute nodes, DESS nodes, and/or dedicated storage nodes such as those discussed above) as indicated by arrows 1010 and 1012. For example, storage 1002 may comprise one or more electronically addressed and/or mechanically addressed storage devices residing on one or more servers accessible via the Internet and the code 1003 may be downloaded to the devices 1004 and 1006. As another example, storage 1002 may be an optical disk or FLASH-based disk which can be connected to the computing devices 1004 and 1006 (e.g., via USB, SATA, PCIe, and/or the like).

When executed by a computing device such as 1004 and 1006, the code 1003 may install and/or initialize one or more of the DESS driver, DESS front-end, DESS back-end, DESS memory controller on the computing device. This may comprise copying some or all of the code 1003 into local storage and/or memory of the computing device(s) 1004 and/or 1006 and beginning to execute the code 1003 (launching one or more DESS processes) by one or more processors of the computing device(s) 1004 and/or 1006. Which of code corresponding to the DESS driver, code corresponding to the DESS front-end, code corresponding to the DESS back-end, and/or code corresponding to the DESS memory controller is copied to local storage and/or memory of the computing device(s) 1004 and/or 1006 and is executed by the computing device(s) 1004 and/or 1006 may be configured by a user during execution of the code 1003 and/or by selecting which portion(s) of the code 1003 to copy and/or launch. In the example shown, execution of the code 1003 by the device 1004 has resulted in one or more client processes and one or more DESS processes being launched on the processor chipset 1014. That is, resources (processor cycles, memory, etc.) of the processor chipset 1014 are shared among the client processes and the DESS processes. On the other hand, execution of the code 1003 by the device 1006 has resulted in one or more DESS processes launching on the processor chipset 1016 and one or more client processes launching on the processor chipset 1018. In this manner, the client processes do not have to share resources of the processor chipset 1016 with the DESS process(es). The processor chipset 1018 may comprise, for example, a process of a network adaptor of the device 1006.

In accordance with an example implementation of this disclosure, a system comprises a plurality of computing devices (e.g., $120_1$-$120_j$) that are communicatively coupled via one or more network links (e.g., 101) and have a file system distributed among them. One or more file system request buffers (e.g., 504, 602, 604, 702, 704, 802, 804, 806, and/or 808) reside on one or more of the plurality of computing devices. File system choking management circuitry (e.g., hardware 302 configured by an OS 312, a DESS front end instance 220, and a choking process 506) that resides on one or more of the plurality of computing devices and is operable to separately control: a first rate at which a first type of file system requests (e.g., one of data requests, data read requests, data write requests, metadata requests, metadata read requests, and metadata write requests) in the one or more buffers are fetched by the file system, and a second rate at which a second type of file system requests (e.g., another of data requests, data read requests, data write requests, metadata requests, metadata read requests, and metadata write requests) are fetched from the one or more buffers. The control of the first rate may comprise an adjustment of a first batch timing setting (e.g., one of data batch timing setting, data read batch timing setting, data write batch timing setting, metadata batch timing setting, metadata read batch timing setting, and metadata write batch timing setting) and/or a first batch size setting (e.g., one of data batch size, data read batch size, data write batch size, metadata batch size, metadata read batch size, and metadata write batch size). The control of the second rate comprises an adjustment of a second batch timing setting (e.g., another of data batch timing setting, data read batch timing setting, data write batch timing setting, metadata batch timing setting, metadata read batch timing setting, and metadata write batch timing setting) and/or a second batch size setting (e.g., another of data batch size, data read batch size, data write batch size, metadata batch size, metadata read batch size, and metadata write batch size). The first type of file system requests may be requests to read data (and not write data nor read or write metadata) from the file system and/or write data (and not read data nor not read or write metadata) to the file system, and the second type of file system requests may be requests to read metadata (and not write metadata nor read or write data) from the file system and/or write metadata (and not read metadata nor read or write data) to the file system. The file system choking management circuitry may be operable to control, separately from the first rate and the second rate, a third rate at which a third type of file system requests in the one or more buffers are serviced by the file system. The control may be based on current and/or predicted load on one or more resources of the plurality of computing devices. The one or more resources may comprise a storage device (e.g., 306); and the current and/or predicted load may be based on a depth of a buffer (e.g., 502) of the storage device. The file system choking management circuitry may be operable to calculate a choking level based on current and/or predicted load on one or more resources of the plurality of computing devices. The control of the first rate and of the second rate may be based on the choking level. The calculation of the choking level may comprises a mapping, according to a first determined function, of a plurality of resource load values for resources of the plurality of computing devices to a plurality of congestion contribution values. The plurality of resource load values comprise two or more of: a network load value; a processing core load value; a memory load value; and a storage device load value. The plurality of resource load values comprises a storage device read load value (e.g. SD_R load, FIG. 9C) and a storage device write load value (e.g. SD_W load, FIG. 9C). The resources of the plurality of computing devices may comprise a storage device (e.g., 306) which stores data and/or metadata of the file system, and the first determined function may be determined based on characteristics of the storage device (e.g., the determination of variables of the piecewise linear function of FIGS. 9B-9D). The system of claim 17, wherein the characteristics of the storage device are determined from one or more of: a manufacturer of the storage device; a manufacturer of a component of the storage device; a model of the storage device; a model of a component of the storage device; a serial number of the storage device; and a serial number of a component of the storage device. The characteristics of the storage device may comprise inputs/outputs per second as a function of buffer depth. The calculation of the choking level may comprises a combining of the plurality of congestion contribution values according to a second determined function (e.g., the summing $y_{CPU}$, $y_{MEM}$, $y_{SD}$, and $y_{NET}$ in FIG. 9B).

Thus, the present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable storage medium (e.g., FLASH drive(s), optical disk(s), magnetic storage disk(s), and/or the like) having stored thereon one or more lines of code executable by a computing device, thereby configuring the machine to be configured to implement one or more aspects of the methods and systems described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration.

As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A distributed storage system (DSS) comprising:
a rate controller circuit;
a local computing device;
a plurality of remote computing devices; and
a network, wherein:
the rate controller circuit to manage choking in the DSS,
the local computing device is associated with a request buffer,
the network communicatively couples the local computing device to the plurality of remote computing devices,
the rate controller to control, according to a batch size, a first rate at which a first type of requests are fetched from the request buffer, and
the rate controller to control a second rate at which a second type of requests are fetched from the request buffer.

2. The DSS of claim 1, wherein rate controller circuit is operable to control the first rate according to a batch timing.

3. The DSS of claim 2, wherein the rate controller circuit is operable to adjust a batch timing setting and a batch size setting.

4. The DSS of claim 1, wherein:
the first type of requests comprise requests to read data from the system and requests to write data to the DSS; and
the second type of requests comprise requests to read metadata from the system and requests to write metadata to the DSS.

5. The DSS of claim 1, wherein the rate controller circuit is operable to adjust:
a data batch timing setting;
a data batch size setting;
a metadata batch timing setting; and
a metadata batch size setting.

6. The DSS of claim 1, wherein:
the first type of requests comprise requests to read data from the DSS and requests to read metadata from the DSS;
and the second type of requests comprise requests to write data to the DSS and requests to write metadata to the DSS.

7. The DSS of claim 1, wherein the rate controller circuit is operable to adjust:
a read batch timing setting;
a read batch size setting;
a write batch timing setting; and
a write batch size setting.

8. The DSS of claim 1, wherein the rate controller circuit is operable to control, independently from the first rate and the second rate, a third rate at which a third type of requests are fetched from one or more buffers.

9. The DSS of claim 1, wherein the rate controller circuit is operable to adjust:
a data read batch timing setting;
a data read batch size setting;
a data write batch timing setting;

a data write batch size setting;
a metadata batch timing setting; and
a metadata batch size setting.

10. The DSS of claim 1, wherein the rate controller circuit is operable to control according to a current load on one or more resources of the local computing device and according to a predicted load on one or more resources of the plurality of remote computing devices.

11. The DSS of claim 10, wherein:
the one or more resources comprise a storage device; and
a load on one or more resources of the plurality of remote computing devices is based on a depth of a buffer of the storage device.

12. The DSS of claim 1, wherein:
the rate controller circuit is operable to calculate a choking level based on a current load and a predicted load on one or more resources of the plurality of remote computing devices; and
the control of the first rate and of the second rate is based on the choking level.

13. The DSS of claim 12, wherein the calculation of the choking level comprises a mapping, according to a first determined function, of a plurality of resource load values for resources of the plurality of remote computing devices to a plurality of congestion contribution values.

14. The DSS of claim 13, wherein the plurality of resource load values comprise two or more of:
a network load value;
a processing core load value;
a memory load value; and
a storage device load value.

15. The DSS of claim 14, wherein the storage device load value is determined based on a depth of a buffer of a storage device of the plurality of remote computing devices.

16. The DSS of claim 13, wherein the plurality of resource load values comprises a storage device read load value and a storage device write load value.

17. The DSS of claim 13 wherein:
the resources of the plurality of remote computing devices comprise a storage device which stores data and/or metadata of the DSS; and
the first determined function is determined based on characteristics of the storage device.

18. The DSS of claim 17, wherein the characteristics of the storage device are determined from one or more of:
a manufacturer of the storage device;
a manufacturer of a component of the storage device;
a model of the storage device;
a model of a component of the storage device;
a serial number of the storage device; and
a serial number of a component of the storage device.

19. The DSS of claim 17, wherein the characteristics of the storage device comprise input/output operations per second (IOPS).

20. The DSS of claim 12, wherein the calculation of the choking level comprises a combining of the plurality of congestion contribution values according to a second determined function.

21. The DSS of claim 1, wherein the rate controller circuit is configured to provide an application programming interface via which one or more settings used by the rate controller circuit for the control the first rate and the second rate are configurable during runtime of the rate controller circuit.

22. The DSS of claim 1, wherein the rate controller circuit is operable to:
determine characteristics of hardware of the plurality of remote computing devices;
perform an initial configuration of one or more settings used by the rate controller circuit for the control the first rate and the second rate based on the characteristics of the hardware; and
adapt the one or more settings as requests are serviced and/or queued for servicing by the DSS.

* * * * *